US011915853B2

(12) United States Patent
Lim et al.

(10) Patent No.: US 11,915,853 B2
(45) Date of Patent: Feb. 27, 2024

(54) COIL COMPONENT

(71) Applicant: SAMSUNG ELECTRO-MECHANICS CO., LTD., Suwon-si (KR)

(72) Inventors: Seung Mo Lim, Suwon-si (KR); Seung Min Lee, Suwon-si (KR); Byeong Cheol Moon, Suwon-si (KR); Yong Hui Li, Suwon-si (KR); Byung Soo Kang, Suwon-si (KR); Ju Hwan Yang, Suwon-si (KR); Tai Yon Cho, Suwon-si (KR); No Il Park, Suwon-si (KR); Tae Jun Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 380 days.

(21) Appl. No.: 17/091,410

(22) Filed: Nov. 6, 2020

(65) Prior Publication Data

US 2021/0383959 A1 Dec. 9, 2021

(30) Foreign Application Priority Data

Jun. 8, 2020 (KR) ........................ 10-2020-0068952

(51) Int. Cl.
*H01F 5/00* (2006.01)
*H01F 27/28* (2006.01)
(Continued)

(52) U.S. Cl.
CPC ......... *H01F 27/2804* (2013.01); *H01F 27/29* (2013.01); *H01F 27/32* (2013.01); *H01F 41/041* (2013.01); *H01F 2027/2809* (2013.01)

(58) Field of Classification Search
CPC .................................................. H01F 27/2804
(Continued)

(56) References Cited

U.S. PATENT DOCUMENTS 11,367,561 B2 6/2022 Lim et al.
2013/0120900 A1 5/2013 Chung et al.
(Continued)

FOREIGN PATENT DOCUMENTS

CN 110783082 A 2/2020
CN 111048294 A 4/2020
(Continued)

OTHER PUBLICATIONS

Office Action issued in corresponding Korean Patent Application No. 10-2020-0068952 dated Sep. 8, 2021, with English translation.
(Continued)

*Primary Examiner* — Ronald Hinson
(74) *Attorney, Agent, or Firm* — MORGAN, LEWIS & BOCKIUS LLP

(57) ABSTRACT

A coil component is provided. The coil component includes a body having fifth and sixth surfaces opposing each other, first and second surfaces respectively connecting the fifth and sixth surfaces of the body and opposing each other, and third and fourth surfaces respectively connecting the first and second surfaces of the body and opposing each other in one direction, a recess disposed in an edge between one of the first and second surfaces of the body and the sixth surface of the body, a coil portion disposed inside the body and exposed through the recess, and an external electrode including a connection portion disposed in the recess and connected to the coil portion, and a pad portion disposed on one surface of the body. A length of the pad portion in the one direction is greater than a length of the connection portion in the one direction.

30 Claims, 8 Drawing Sheets

(51) Int. Cl.
*H01F 27/29* (2006.01)
*H01F 41/04* (2006.01)
*H01F 27/32* (2006.01)

(58) Field of Classification Search
USPC .......................................................... 336/200
See application file for complete search history.

(56) References Cited

U.S. PATENT DOCUMENTS

| | | | | |
|---|---|---|---|---|
| 2015/0048915 | A1* | 2/2015 | Yoon | H01F 17/0013 336/192 |
| 2016/0104565 | A1 | 4/2016 | Nishiyama | |
| 2016/0225521 | A1* | 8/2016 | Yamada | H01F 41/0246 |
| 2017/0084376 | A1 | 3/2017 | Kubota et al. | |
| 2017/0207018 | A1* | 7/2017 | Jung | H01F 27/2804 |
| 2018/0182537 | A1* | 6/2018 | Shimizu | H01F 27/29 |
| 2020/0013540 | A1 | 1/2020 | Kang et al. | |
| 2020/0035404 | A1 | 1/2020 | Lim et al. | |
| 2020/0098508 | A1 | 3/2020 | Park et al. | |
| 2020/0118729 | A1 | 4/2020 | Lim et al. | |
| 2021/0012947 | A1* | 1/2021 | Ishima | H01F 27/2804 |

FOREIGN PATENT DOCUMENTS

| | | | |
|---|---|---|---|
| JP | 2016-81980 | A | 5/2016 |
| JP | 2020-10011 | A | 1/2020 |
| JP | 2020-17716 | A | 1/2020 |
| KR | 10-2013-0053878 | A | 5/2013 |
| KR | 10-2015-0019730 | A | 2/2015 |
| KR | 10-1548862 | B1 | 8/2015 |
| KR | 10-2052834 | B1 | 12/2019 |
| KR | 10-2020-0005011 | A | 1/2020 |
| KR | 10-2020-0033451 | A | 3/2020 |
| WO | 2016/013643 | A1 | 1/2016 |

OTHER PUBLICATIONS

Office Action issued in corresponding Japanese Patent Application No. 2020-186762 dated Feb. 1, 2022, with English translation.
Office Action issued in corresponding Chinese Patent Application No. 202110077310.3 dated Dec. 22, 2023, with English translation.

* cited by examiner

COIL COMPONENT

CROSS-REFERENCE TO RELATED APPLICATION(S)

This application claims the benefit under 35 USC 119(a) of Korean Patent Application No. 10-2020-0068952 filed on Jun. 8, 2020 in the Korean Intellectual Property Office, the entire disclosure of which is incorporated herein by reference for all purposes.

TECHNICAL FIELD

The present disclosure relates to a coil component.

BACKGROUND

Inductors, as coil components, are representative passive electronic components used in electronic devices, along with resistors and capacitors.

As electronic devices have become increasingly better in terms of performance and smaller, electronic components used in electronic devices are increasing in number and are being miniaturized in size.

An external electrode of a coil component is generally formed by coating and curing a conductive paste on both end surfaces of a component body, opposing each other in the length direction, and in this case, the length of the entire component may be increased. In addition, when the component is mounted on a substrate, the effective mounting area of the component is increased in consideration of the formation area of a bonding member such as solder or the like on a mounting surface of the substrate.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An embodiment of the present disclosure is to provide a lightweight, thinned and size-reduced coil component.

According an aspect of the present disclosure, a coil component includes a body having a sixth surface and a fifth surface opposing each other, a first surface and a second surface respectively connecting the fifth and sixth surfaces of the body and opposing each other, and a third surface and a fourth surface respectively connecting the first surface and the second surface of the body and opposing each other in one direction, a recess disposed in an edge between one of the first surface and the second surface of the body and the sixth surface of the body, a coil portion disposed inside the body and exposed through the recess, and an external electrode including a connection portion disposed in the recess and connected to the coil portion, and a pad portion disposed on the sixth surface of the body. A length of the pad portion in the one direction is greater than a length of the connection portion in the one direction.

According an aspect of the present disclosure, a coil component includes a body having a sixth surface and a fifth surface opposing each other, a first surface and a second surface respectively connecting the fifth surface and the sixth surface of the body and opposing each other, and a third surface and a fourth surface respectively connecting the first surface and the second surface of the body; a recess disposed in an edge between one of the first surface and the second surface of the body and the sixth surface of the body; a coil portion disposed inside the body and exposed from the body through the recess; an external electrode including a connection portion disposed in the recess and connected to the coil portion, and a pad portion disposed on the sixth surface of the body; and a first insulating layer disposed in the recess and having an opening exposing the connection portion.

According an aspect of the present disclosure, a coil component includes a body having a sixth surface and a fifth surface opposing each other, a first surface and a second surface respectively connecting the fifth surface and the sixth surface of the body and opposing each other, and a third surface and a fourth surface respectively connecting the first surface and the second surface of the body and opposing each other in one direction; a recess disposed in an edge between one of the first surface and the second surface of the body and the sixth surface of the body; a coil portion disposed inside the body and exposed from the body through the recess; an external electrode including a connection portion disposed in the recess and connected to the coil portion, and a pad portion disposed on the sixth surface of the body; and an insulating member disposed in the recess. A thickness of a portion of the insulating member disposed on the connection portion is less than a thickness of another portion of the insulating member spaced apart from the connection portion.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
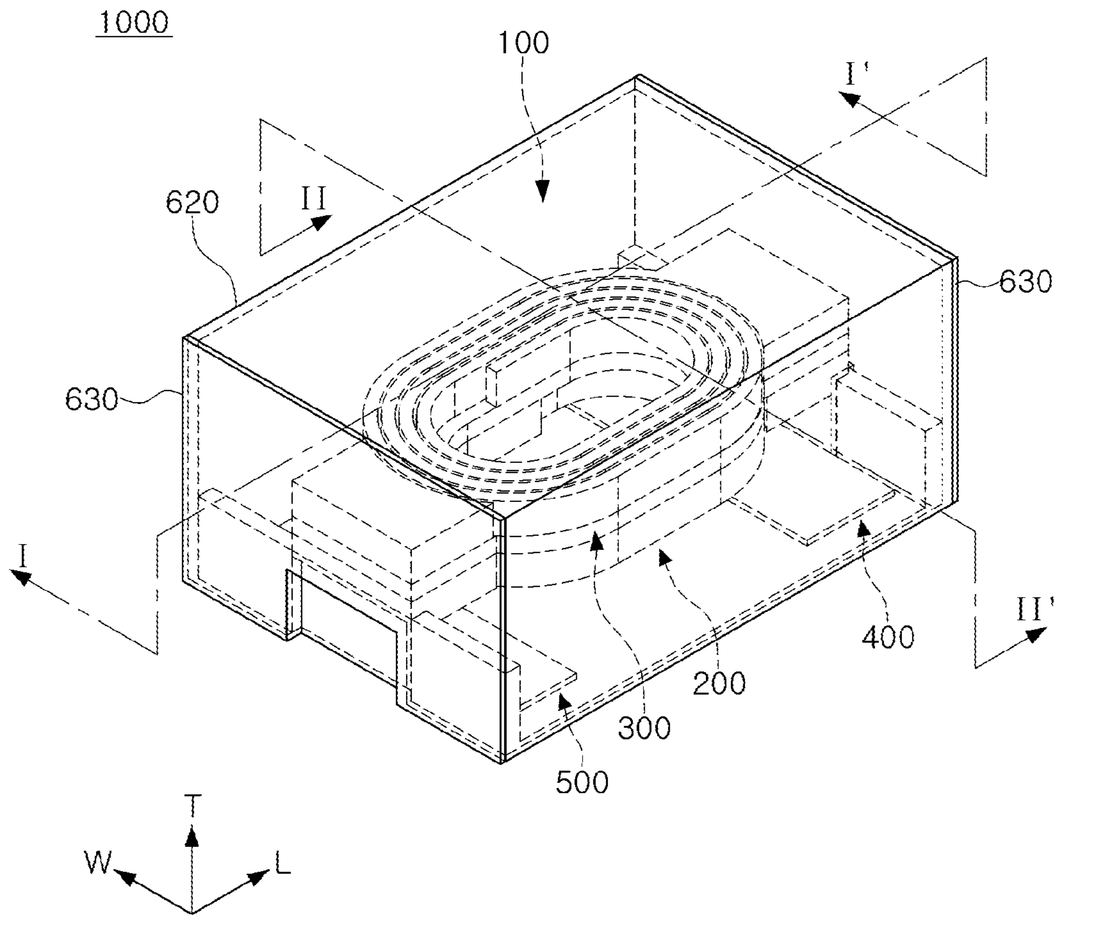
FIG. 1 is a view schematically illustrating a coil component according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In addition, the term "coupled" does not mean only a case in which respective components are in direct physical contact with each other in the contact relationship between the components, but also a case in which a different component is interposed between the components to contact each other, as an inclusive concept.

In the drawings, the L direction may be defined as a first direction or a length direction, the W direction may be defined as a second direction or a width direction, and the T direction may be defined as a third direction or a thickness direction.

Hereinafter, a coil component according to an embodiment will be described in detail with reference to the accompanying drawings, and in the description with reference to the accompanying drawings, the same or corresponding components are given the same reference numbers and overlapped descriptions thereof is omitted.

Various types of electronic components are used in electronic devices, and various types of coil components may be appropriately used between the electronic components, to remove noise.

For example, coil components in electronic devices may be used as power inductors, high frequency inductors (HF inductors), general beads, high frequency beads (GHz beads), common mode filters, or the like.

Figure 2:
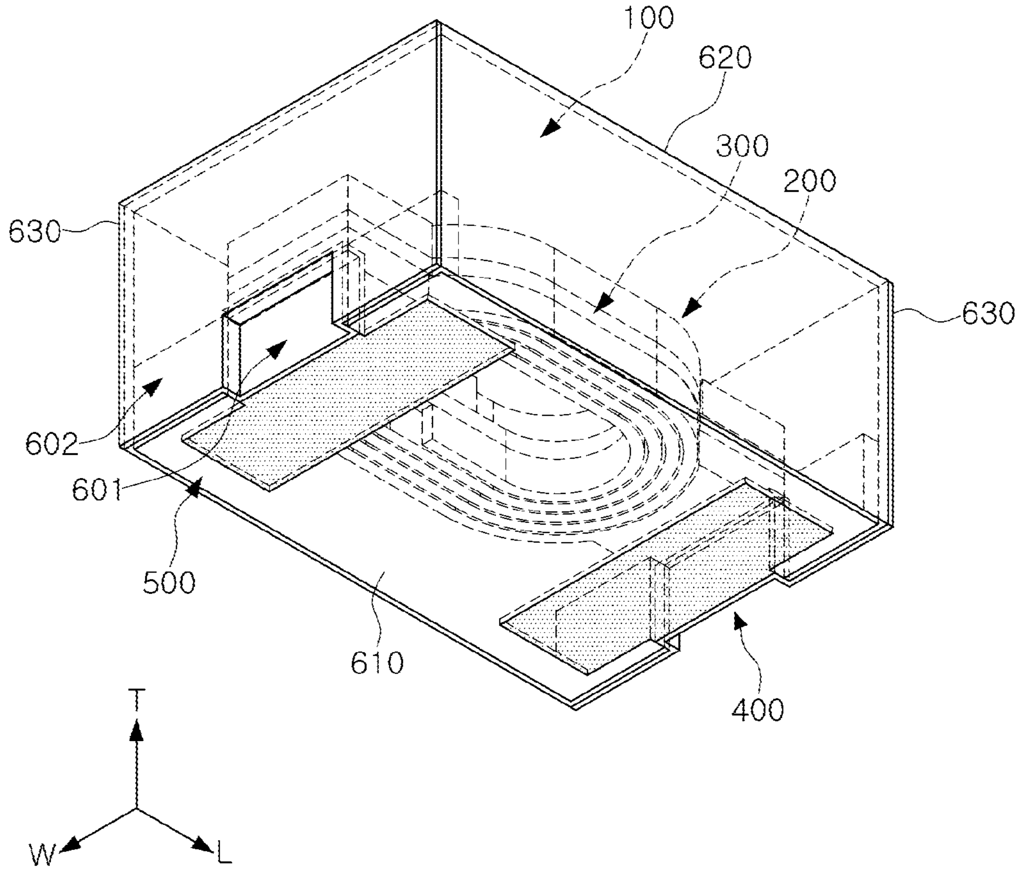
FIG. 2 is a view illustrating a coil component as viewed from a lower side according to an embodiment.
Figure 3:
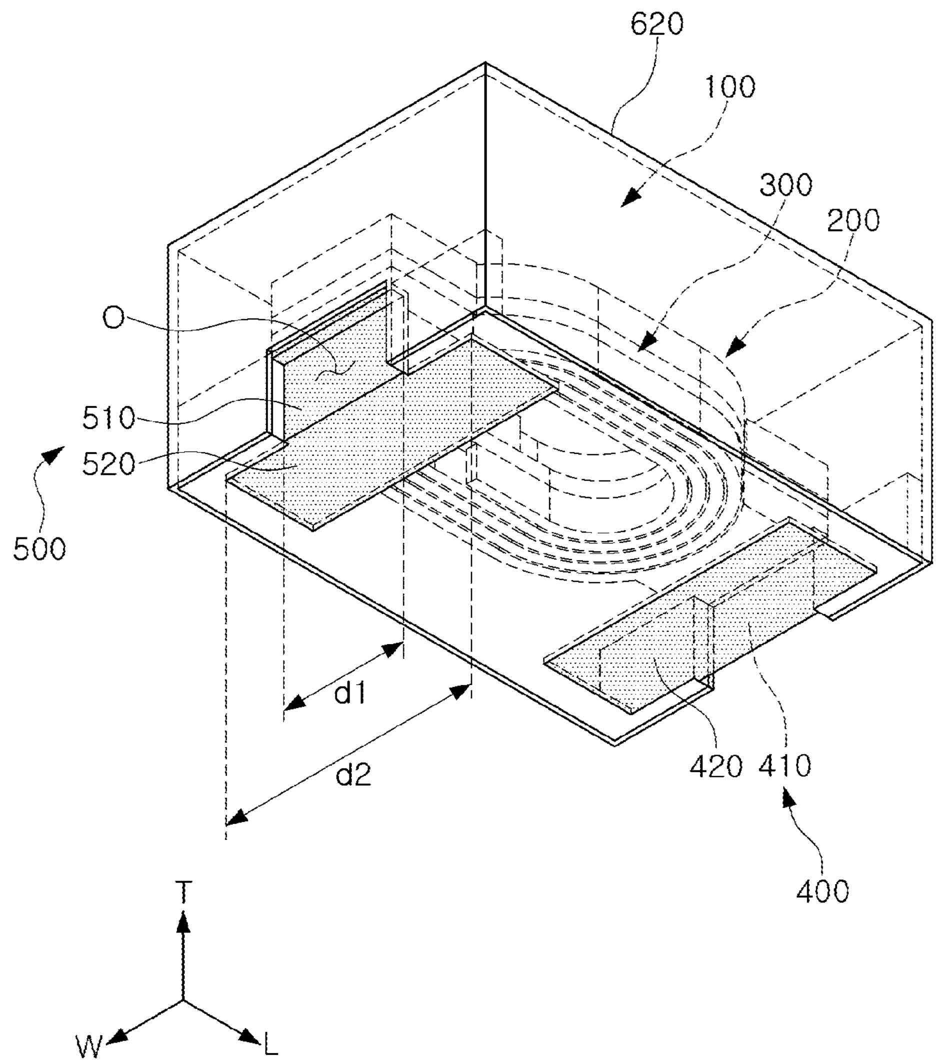
FIG. 3 is a diagram illustrating that a third insulating layer is omitted from FIG. 2.
Figure 4:
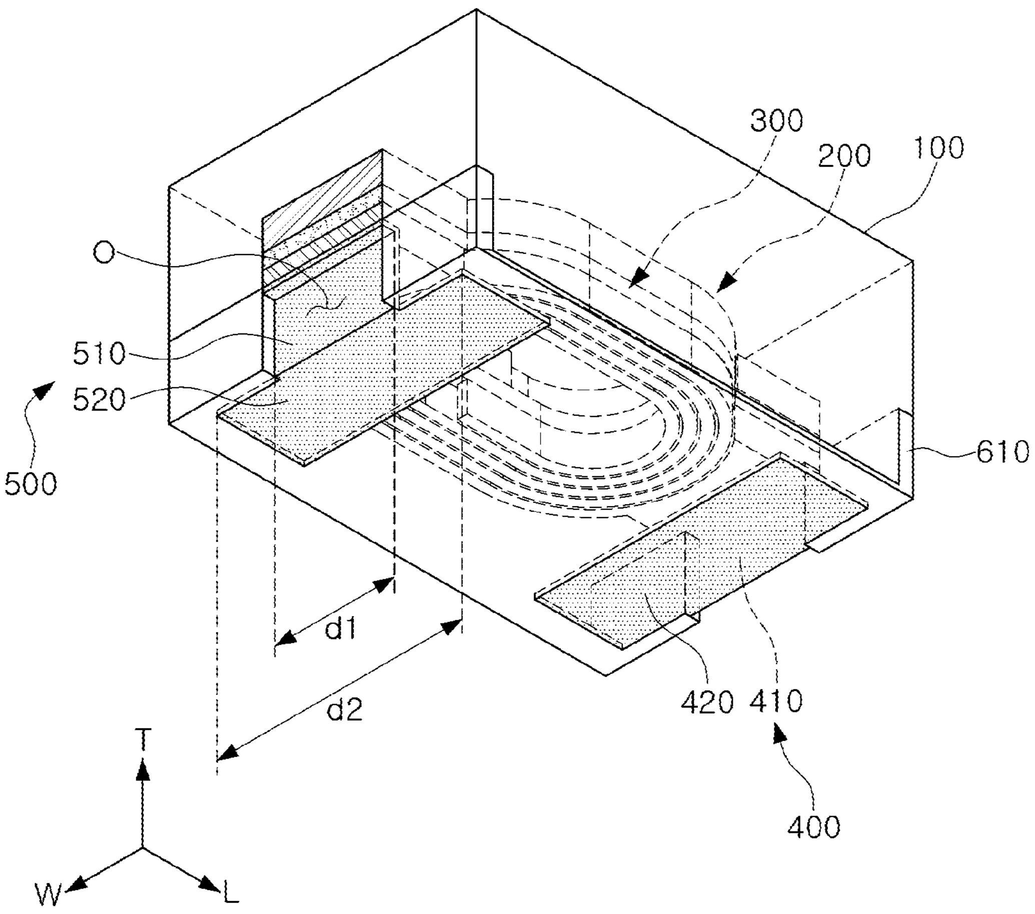
FIG. 4 is a diagram illustrating that a second insulating layer is omitted from FIG. 3.
Figure 5:
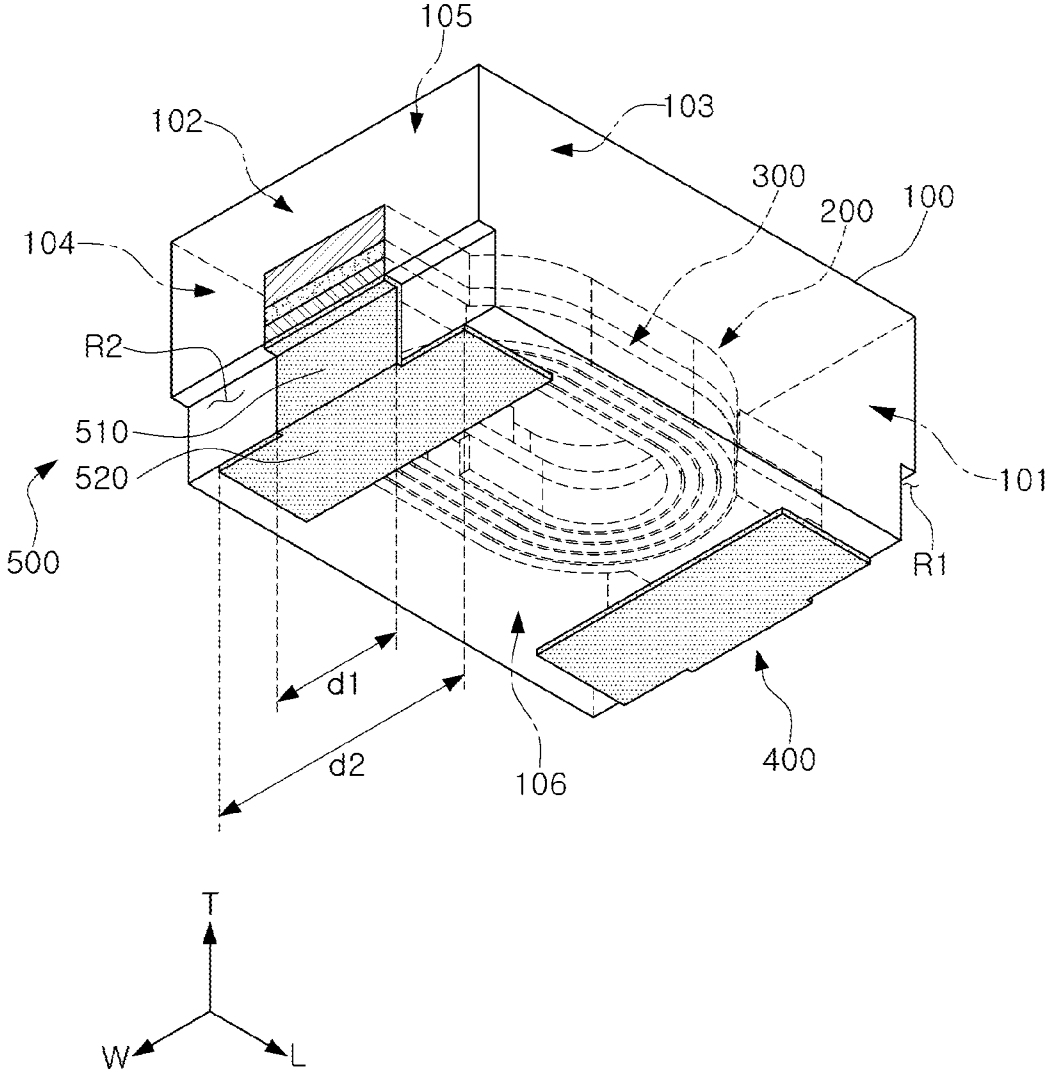
FIG. 5 is a view illustrating that a first insulating layer is omitted from FIG. 4.
Figure 6:
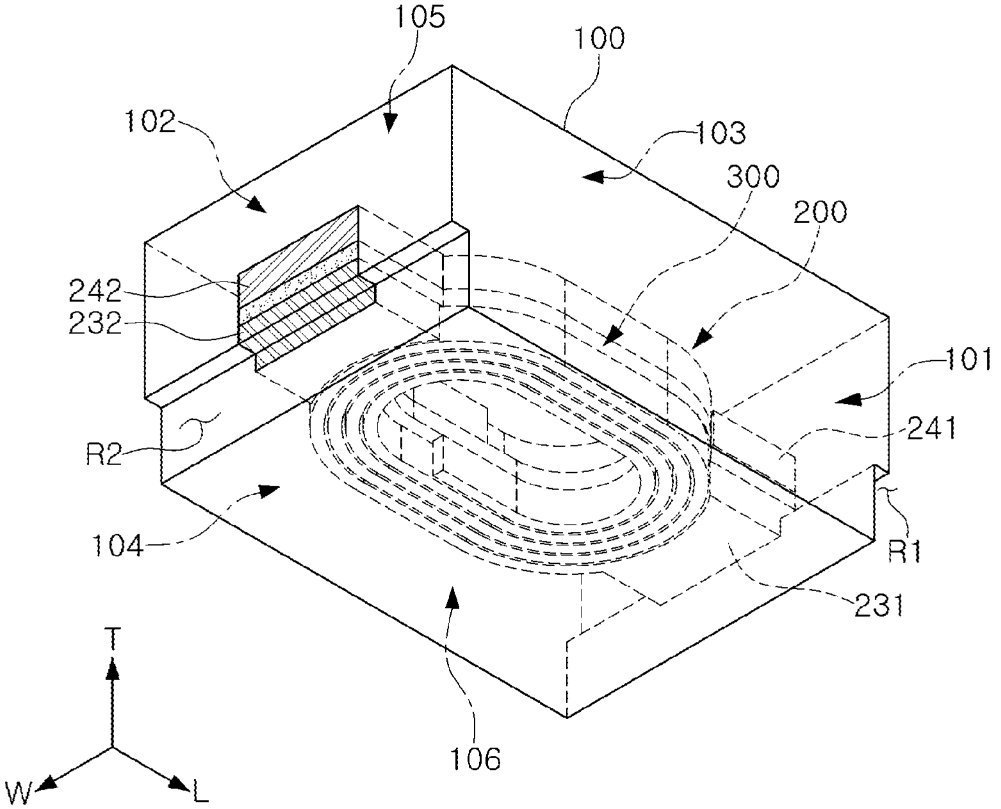
FIG. 6 is a view illustrating that an external electrode is omitted from FIG. 5.
Figure 7:
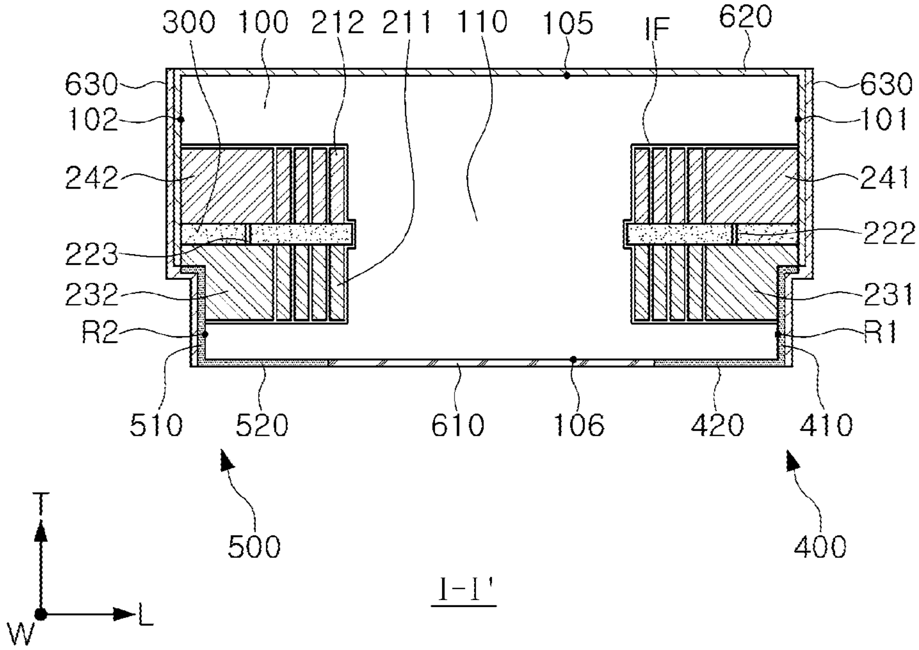
FIG. 7 is a diagram illustrating a cross-sectional view taken along line I-I' of FIG. 1.
Figure 8:
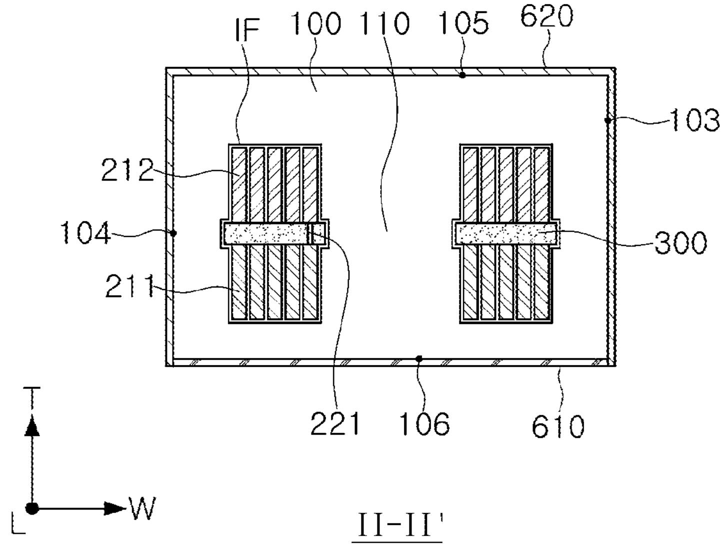
FIG. 8 is a view illustrating a cross-sectional view taken along line II-II' of FIG. 1.
Figure 9:
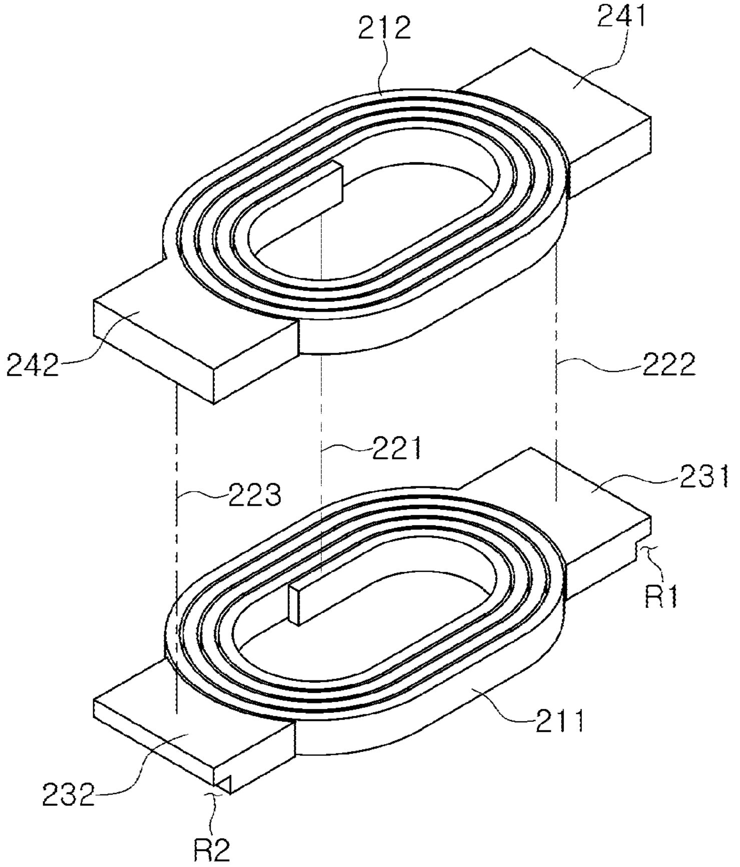
FIG. 9 is a view illustrating an exploded coil portion.

FIG. 1 is a view schematically illustrating a coil component according to an embodiment. FIG. 2 is a view illustrating a coil component according to an embodiment as viewed from a lower side. FIG. 3 is a diagram illustrating that a third insulating layer is omitted from FIG. 2. FIG. 4 is a diagram illustrating that a second insulating layer is omitted from FIG. 3. FIG. 5 is a diagram illustrating that a first insulating layer is omitted from FIG. 4. FIG. 6 is a diagram illustrating that an external electrode is omitted from FIG. 5. FIG. 7 is a diagram illustrating a cross-sectional view taken along line I-I' of FIG. 1. FIG. 8 is a diagram illustrating a cross-sectional view taken along line II-II' of FIG. 1. FIG. 9 is a view illustrating an exploded coil portion.

Referring to FIGS. 1 to 9, a coil component 1000 according to an embodiment includes a body 100, a coil portion 200, a support substrate 300, external electrodes 400 and 500, and insulating layers 610, 620 and 630, and may further include an insulating film IF.

The body 100 forms the exterior of the coil component 1000 according to the present embodiment, and may include the coil portion 200 and the support substrate 300 therein.

The body 100 may be formed to have a substantially hexahedral shape.

Based on FIGS. 5 and 6, the body 100 includes a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. The first to fourth surfaces 101, 102, 103 and 104 of the body 100 correspond to a wall surface of the body 100 that connects the fifth surface 105 and the sixth surface 106 of the body 100. Hereinafter, both end surfaces of the body 100 refer to the first surface 101 and the second surface 102 of the body, and both side surfaces of the body 100 refer to the third surface 103 and the fourth surface of the body 100.

The body 100 may be formed in such a manner that the coil component 1000 according to the present embodiment in which the external electrodes 400 and 500 and the insulating layers 610, 620 and 630 to be described later have been formed has a length of 2.0 mm, a width of 1.2 mm and a thickness of 0.65 mm, by way of example, but the configuration is not limited thereto.

The body 100 may include a magnetic material and a resin. In detail, the body 100 may be formed by laminating one or more magnetic composite sheets in which a magnetic material is dispersed in a resin. In addition, the body 100 may also have a structure other than the structure in which a magnetic material is dispersed in a resin. For example, the body 100 may be formed of a magnetic material such as ferrite.

The magnetic material may be ferrite or magnetic metal powder.

The ferrite may be at least one or more of, for example, Mg—Zn-based, Mn—Zn-based, Mn—Mg-based, Cu—Zn-based, Mg—Mn—Sr-based and Ni—Zn-based spinel-type ferrites, Ba—Zn-based, Ba—Mg-based, Ba—Ni-based, Ba—Co-based and Ba—Ni—Co-based hexagonal ferrites, Y-based garnet-type ferrites, and Li-based ferrites.

The magnetic metal powder may include any one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder may be at least one or more of pure iron powder, Fe—Si alloy powder, Fe—Si—Al alloy powder, Fe—Ni alloy powder, Fe—Ni—Mo alloy powder, Fe—Ni—Mo—Cu alloy powder, Fe—Co alloy powder, Fe—Ni—Co alloy powder, Fe—Cr alloy powder, Fe—Cr—Si alloy powder, Fe—Si—Cu—Nb alloy powder, Fe—Ni—Cr alloy powder, and Fe—Cr—Al alloy powder.

The magnetic metal powder may be amorphous or crystalline. For example, the magnetic metal powder may be a Fe—Si—B—Cr-based amorphous alloy powder, but is not limited thereto.

Ferrite and magnetic metal powder particles may each have an average diameter of about 0.1 μm to 30 μm, but the average diameter thereof is not limited thereto.

The body 100 may include two or more types of magnetic materials dispersed in a resin. In this case, that the magnetic materials are of different types indicates that the magnetic materials dispersed in the resin are distinguishable from each other by any one of an average diameter, a composition, crystallinity and a shape.

The resin may include, but is not limited to, epoxy, polyimide, liquid crystal polymer, or the like alone or in combination.

The body 100 includes a core 110 penetrating through the coil portion 200 and the support substrate 300 to be described later. The core 110 may be formed by filling a through-hole penetrating through respective central portions of the coil portion 200 and the support substrate 300, with the magnetic composite sheet, but the configuration is not limited thereto.

Recesses R1 and R2 are formed at edges between the first and second surfaces 101 and 102 of the body 100 and the sixth surface 106 of the body 100, respectively. For example, the first recess R1 is formed at an edge between the first surface 101 of the body 100 and the sixth surface 106 of the body 100, and the second recess R2 is formed at an edge between the second surface 102 of the body 100 and the sixth surface 106 of the body 100. On the other hand, the recesses R1 and R2 are formed to have a depth (the length of the recesses R1 and R2 in a thickness direction T) exposed to inner surfaces of the recesses R1 and R2 by lead-out portions 231 and 232 to be described later, but the recesses R1 and R2 do not extend up to the fifth surface 105 of the body 100. For example, the recesses R1 and R2 do not penetrate through the body 100 in the thickness direction T.

The recesses R1 and R2 extend to the third and fourth surfaces 103 and 104 of the body 100 in the width direction W of the body 100, respectively. For example, the recesses R1 and R2 may be in the form of slits formed in the entire width direction W of the body 100. The recesses R1 and R2 may be formed by being pre-diced on one surface of a coil bar along a boundary line coinciding with the width direction of each coil component, among boundary lines for individualizing respective coil components, at the coil bar level before the respective coil components are individualized. A depth during the pre-dicing is adjusted in such a manner that the lead-out portions 231 and 232 are exposed.

On the other hand, the inner surfaces of the recesses R1 and R2 also constitute the surface of the body 100, but in this specification, the inner surfaces of the recesses R1 and R2 are to be distinguished from the surface of the body 100 for convenience of description. In addition, in FIGS. 5 to 7, the recesses R1 and R2 are illustrated as having inner walls parallel to the first and second surfaces 101 and 102 of the body 100, and lower surfaces parallel to the fifth and sixth surfaces 105 and 106 of the body 100, for convenience of description, but the scope of the present embodiment is not limited thereto. As an example, based on the length-thickness direction cross section (an L-T cross section) of the coil component 1000 according to the present embodiment, the first recess R1 may be formed to have the inner surface having a curved shape connecting the first surface 101 and the sixth surface 106 of the body 100. However, in this specification, for convenience of description, it will be described that the recesses R1 and R2 have an inner wall and a lower surface.

The support substrate 300 is embedded in the body 100. The support substrate 300 is configured to support the coil portion 200 to be described later.

The support substrate 300 may be formed of an insulating material including a thermosetting insulating resin such as an epoxy resin, a thermoplastic insulating resin such as polyimide, or a photoimageable insulating resin, or may be formed of an insulating material in which a reinforcing material such as glass fiber or inorganic filler is impregnated with this insulating resin. As an example, the support substrate 300 may be formed of an insulating material such as prepreg, Ajinomoto Build-up Film (ABF), FR-4, a Bismaleimide Triazine (BT) resin, Photo Imagable Dielectric (PID), or the like, but the material is not limited thereto.

As the inorganic filler, at least one or more selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 300 is formed of an insulating material including a reinforcing material, the support substrate 300 may provide relatively more excellent rigidity. When the support substrate 300 is formed of an insulating material that does not contain glass fibers, it is advantageous in reducing the thickness of the coil component 1000 according to the present embodiment. Further, based on the body 100 of the same size, the volume occupied by the coil portion 200 and/or the magnetic material may be increased, thereby improving component characteristics. When the support substrate 300 is formed of an insulating material including a photoimageable insulating resin, the number of processes for forming the coil portion 200 is reduced, which is advantageous in reducing production costs, and in forming fine vias.

The coil portion 200 is disposed inside the body 100 to exhibit characteristics of a coil component. For example, when the coil component 1000 in the present embodiment is used as a power inductor, the coil portion 200 may serve to stabilize power of an electronic device by storing an electric field as a magnetic field and maintaining an output voltage.

The coil portion 200 includes coil patterns 211 and 212, lead-out portions 231 and 232, auxiliary lead-out portions 241 and 242, and vias 221, 222 and 223. In detail, based on the directions of FIGS. 1, 7 and 8, a first coil pattern 211, a first lead-out portion 231 and a second lead-out portion 232 are disposed on a lower surface of the support substrate 300 facing the sixth surface 106 of the body 100; and a second coil pattern 212, a first auxiliary lead-out portion 241 and a second auxiliary lead-out portion 242 are disposed on an upper surface of the support substrate 300 opposing the lower surface of the support substrate 300. On the lower surface of the support substrate 300, the first coil pattern 211 is connectedly in contact with the first lead-out portion 231, and each of the first coil pattern 211 and the first lead-out portion 231 is spaced apart from the second lead-out portion 232. On the upper surface of the support substrate 300, the second coil pattern 212 is connectedly in contact with the second auxiliary lead-out portion 242, and the second coil pattern 212 and the second auxiliary lead-out portion 242 are spaced apart from the first auxiliary lead-out portion 241. The first via 221 penetrates through the support substrate 300 and is connectedly in contact with the first coil pattern 211 and the second coil pattern 212, respectively; the second via 222 penetrates through the support substrate 300 and are connectedly in contact with the first lead-out portion 231 and the first auxiliary lead-out portion 241, respectively; and the third via 223 penetrates through the support substrate 300 and are connectedly in contact with the second lead-out portion 232 and the second auxiliary lead-out portion 242, respectively. Accordingly, the coil portion 200 may function as a single coil as a whole.

Each of the first coil pattern 211 and the second coil pattern 212 may have a shape of a planar spiral in which at least one turn is formed with the core 110 as an axis. For example, the first coil pattern 211 may form at least one turn with the core 110 as an axis on the lower surface of the support substrate 300.

The first lead-out portion 231 and the second lead-out portion 232 are exposed through the recesses R1 and R2, respectively. For example, the first lead-out portion 231 is exposed to the inner surface of the first recess R1, and the second lead-out portion 232 is exposed to the inner surface of the second recess R2. Since the external electrodes 400 and 500 to be described later are disposed in the recesses R1 and R2, the coil portion 200 and the external electrodes 400 and 500 are connectedly in contact with each other. On the other hand, hereinafter, for convenience of description, as illustrated in FIGS. 5 to 7 and 9, it is described the case in which the recesses R1 and R2 are formed to extend inwardly of at least portions of the lead-out portions 231 and 232, respectively such that the lead-out portions 231 and 232 are exposed on the inner walls and the lower surfaces of the recesses R1 and R2, respectively, but this is only an example, and the scope of the present embodiment is not limited thereto. For example, the depth of the recesses R1 and R2 may also be adjusted so that the lead-out portions 231 and 232 are exposed only to the lower surfaces of the recesses R1 and R2.

One surfaces of the lead-out portions 231 and 232 exposed to the inner surfaces of the recesses R1 and R2 may have a surface roughness higher than a surface roughness of the other surfaces of the lead-out portions 231 and 232. For example, when the lead-out portions 231 and 232 are formed by electroplating and the recesses R1 and R2 are then formed in the lead-out portions 231 and 232 and the body 100, portions of the lead-out portions 231 and 232 are removed in a recess formation process. Accordingly, one surfaces of the lead-out portions 231 and 232 exposed to the inner walls and lower surfaces of the recesses R1 and R2 have a higher surface roughness than a surface roughness of the remaining surfaces of the lead-out portions 231 and 232 due to the polishing of the dicing tip. As will be described later, the external electrodes 400 and 500 are formed of relatively thin films, so that the bonding force thereof with the body 100 may be weak. However, since the external electrodes 400 and 500 according to an embodiment are connectedly in contact with one surfaces of the lead-out portions 231 and 232 having relatively high surface roughness, the bonding force between the external electrodes 400 and 500 and the lead-out portions 231 and 232 may be improved.

The lead-out portions 231 and 232 and the auxiliary lead-out portions 241 and 242 are exposed to the first and second surfaces 101 and 102 of the body 100, respectively. For example, the first lead-out portion 231 is exposed to the first surface 101 of the body 100, and the second lead-out portion 232 is exposed to the second surface 102 of the body 100. The first auxiliary lead-out portion 241 is exposed to the first surface 101 of the body 100, and the second auxiliary lead-out portion 242 is exposed to the second surface 102 of the body 100. Accordingly, as illustrated in FIG. 6, the first lead-out portion 231 is continuously exposed to the inner wall of the first recess R1, the lower surface of the first recess R1, and the first surface 101 of the body 100, and the second lead-out portion 232 is continuously exposed to the inner wall of the second recess R2, the lower surface of the second recess R2 and the second surface 102 of the body 100.

At least one of the coil patterns 211 and 212, the vias 221, 222 and 223, the lead-out portions 231 and 232, and the auxiliary lead-out portions 241 and 242 may include at least one conductive layer.

For example, when the second coil pattern 212, the auxiliary lead-out portions 241 and 242, and the vias 221, 222 and 223 are formed by plating on the upper surface side of the support substrate 300, the second coil pattern 212, the auxiliary lead-out portions 241 and 242, and the vias 221, 222 and 223 may each include a seed layer and an electroplating layer. In this case, the electroplating layer may have a single-layer structure or a multi-layer structure. The multilayer electroplating layer may be formed in a conformal film structure in which the other electroplating layer is formed along the surface of one electroplating layer, or may also be formed to have a shape in which another electroplating layer is laminated on only one surface of one electroplating layer. The seed layer may be formed by an electroless plating method or a vapor deposition method such as sputtering. A seed layer of the second coil pattern 212, seed layers of the auxiliary lead-out portions 241 and 242, and seed layers of the vias 221, 222 and 223 may be formed integrally, so that a boundary may not be formed therebetween, but the configurations are not limited thereto. An electroplating layer of the second coil pattern 212, electroplating layers of the auxiliary lead-out portions 241 and 242, and electroplating layers of the vias 221, 222 and 223 may be formed integrally, so that a boundary may not be formed therebetween, but the configuration is not limited thereto.

As another example, in a case in which, the first coil pattern 211 and the lead-out portions 231 and 232 disposed on the lower surface side of the support substrate 300, and the second coil pattern 212 and the auxiliary lead-out portions 241 and 242 disposed on the upper surface side of the support substrate 300, are formed separately from each other, and then collectively laminated on the support substrate 300 to form the coil portion 200; the vias 221, 222 and 223 may include a high melting point metal layer, and a low melting point metal layer having a melting point lower than that of the high melting point metal layer. In this case, the low melting point metal layer may be formed of solder containing lead (Pb) and/or tin (Sn). At least a portion of the low melting point metal layer is melted due to pressure and temperature at the time of batch lamination, and for example, an intermetallic compound layer (an IMC layer) may be formed at the boundary between the low melting point metal layer and the second coil pattern 212.

For example, the coil patterns 211 and 212, the lead-out portions 231 and 232 and the auxiliary lead-out portions 241 and 242 may be formed to respectively protrude from the lower and upper surfaces of the support substrate 300, as illustrated in FIGS. 7 and 8. As another example, the first coil pattern 211 and the lead-out portions 231 and 232 are formed to protrude from the lower surface of the support substrate 300, and the second coil pattern 212 and the auxiliary lead-out portions 241 and 242 are embedded in the upper surface of the substrate 300, such that upper surfaces thereof may be exposed to the upper surface of the support substrate 300. In this case, a concave portion may be formed in the upper surface of the second coil pattern 212 and/or the upper surfaces of the auxiliary lead-out portions 241 and 242, so that the upper surface of the support substrate 300 and the upper surface of the second coil pattern 212 and/or the upper surfaces of the auxiliary lead-out portions 241 and 242 may not be located on the same plane.

Each of the coil patterns 211 and 212, the lead-out portions 231 and 232, the auxiliary lead-out portions 241 and 242, and the vias 221, 222 and 223 may be formed of a conductive material such as copper (Cu), aluminum (Al), silver (Ag), Tin (Sn), gold (Au), nickel (Ni), lead (Pb), titanium (Ti), chromium (Cr), or alloys thereof, but the material is not limited thereto.

On the other hand, referring to FIG. 9, since the first auxiliary lead-out portion 241 is irrelevant to the electrical connection of the rest of the coil portion 200, the first auxiliary lead-out portion 241 and the second via 222 may be omitted in another embodiment. On the other hand, the first auxiliary lead-out portion 241 may also be formed to omit the process of distinguishing the fifth surface 105 and the sixth surface 106 of the body 100.

The external electrodes 400 and 500 may include connection portions 410 and 510 disposed in the recesses R1 and R2 and connected to the coil portion 200, and pad portions 420 and 520 disposed on the sixth surface 106 of the body 100. In detail, the first external electrode 400 includes a first connection portion 410 disposed on the lower surface and the inner wall of the first recess R1 to be connectedly in contact with the first lead-out portion 231 of the coil portion 200, and a first pad portion 420 disposed on the sixth surface 106 of the body 100. The second external electrode 500 includes a second connection portion 510 disposed on the lower surface and the inner wall of the second recess R2 to be connectedly in contact with the second lead-out portion 232 of the coil portion 200, and a second pad portion 520 disposed on the sixth surface 106 of the body 100. The first pad portion 420 and the second pad portion 520 are disposed to be spaced apart from each other on the sixth surface of the body 100.

The external electrodes 400 and 500 are formed along the lower surfaces and inner walls of the recesses R1 and R2 and along the sixth surface 106 of the body 100, respectively. For example, the external electrodes 400 and 500 are formed in the form of conformal films on the inner surfaces of the recesses R1 and R2 and the sixth surface 106 of the body 100. The connection portions 410 and 510 and the pad portions 420 and 520 of the external electrodes 400 and 500 may be formed together in the same process, and may be integrally formed on the inner walls of the recesses R1 and R2 and the sixth surface 106 of the body 100. For example, a boundary may not be formed between the connection portions 410 and 510 and the pad portions 420 and 520.

The external electrodes 400 and 500 may be formed by a plating method and/or a vapor deposition method such as sputtering or the like, but the formation method is not limited thereto.

The external electrodes 400 and 500 may be formed of a conductive material such as copper (Cu), aluminum (Al), silver (Ag), tin (Sn), gold (Au), nickel (Ni), lead (Pb), chromium (Cr), titanium (Ti) or alloys thereof, but the material thereof is not limited thereto. The external electrodes 400 and 500 may be formed in a single layer or multilayer structure. As an example, the external electrodes 400 and 500 may each include first and second layers which are sequentially formed by plating, on the pad portions 420 and 520 including copper (Cu), which contain nickel (Ni) and tin (Sn), respectively, but the configuration is not limited thereto.

The connection portions 410 and 510 are formed to have a length d1 in the width direction W, which is less than a length d2 of each of the pad portions 420 and 520 in the width direction W. For example, the length d2 of the pad portions 420 and 520 in the width direction W is greater than the length d1 of the connection portions 410 and 510 in the width direction W. The sixth surface 106 of the body 100 is used as a mounting surface when the coil component 1000 according to the present embodiment is mounted on a mounting substrate, and the pad portions 420 and 520 of the external electrodes 400 and 500 may be respectively connected to connection pads of the mounting substrate through a bonding member such as solder or the like. In this case, since the length d2 of each of the pad portions 420 and 520 in the width direction W is formed to be greater than the length d1 of each of the connection portions 410 and 510 in the width direction W, the area of the pad portions 420 and 520 in contact with the bonding member may be increased, and thus, the bonding force between the pad portions 420 and 520 and the mounting substrate may be improved. In addition, since the length d1 of each of the connection portions 410 and 510 in the width direction W is shorter than the length d2 of each of the pad portions 420 and 520 in the width direction W, short-circuits with other components mounted on the mounting substrate may be prevented. For example, among the configurations of the external electrodes 400 and 500, the size (the length d1 in the width direction W) of the connection portions 410 and 510 that are most adjacent to other components during mounting is formed to be relatively small, thereby reducing the likelihood of a short-circuit.

The insulating film IF is disposed between the coil portion 200 and the body 100 and between the support substrate 300 and the body 100. The insulating film IF may be formed along the surfaces of the lead-out portions 231 and 232, the coil patterns 211 and 212, the support substrate 300, and the auxiliary lead-out portions 241 and 242, but the configuration is not limited thereto. The insulating film IF is provided to insulate the coil portion 200 and the body 100 from each other, and may include a known insulating material such as parylene or the like, but that material thereof is not limited thereto. As another example, the insulating film IF may include an insulating material such as an epoxy resin rather than parylene. The insulating film IF may be formed by a vapor deposition method, but the forming method thereof is not limited thereto. As another example, the insulating film IF may be formed by laminating and curing an insulating film for forming the insulating film IF on both surfaces of the support substrate 300 on which the coil portion 200 is formed, and may also be formed by coating and curing an insulating paste for forming the insulating film IF on both surfaces of the support substrate 300 on which the coil portion 200 is formed. On the other hand, for the aforementioned reason, the insulating film IF is a configuration that may be omitted in the present embodiment. For example, if the body 100 has sufficient insulation resistance at the designed operating current and voltage, the insulating film IF may be omitted in the present embodiment.

The first insulating layer 610 is disposed in the recesses R1 and R2. An opening O is formed in the first insulating layer 610 to expose the connection portions 410 and 510. In detail, referring to FIG. 4, the first insulating layer 610 is formed in a form that fills the recesses R1 and R2, and is disposed to be spaced apart from the inner surfaces of the recesses R1 and R2 by the connection portions 410 and 510 exposed to the opening O. The first insulating layer 610 disposed in the recesses R1 and R2 may have a distance that is from one surface in contact with the inner wall of each of the recesses R1 and R2 to the other surface opposing the one surface of the first insulating layer 610, the distance corresponding to a width (a distance from the first and second surfaces 101 and 102 of the body 100 to the inner walls of the recesses R1 and R2 in the length direction L) of each of the recesses R1 and R2. As a result, the other surface of the first insulating layer 610 may be disposed on substantially the same plane as the first and second surfaces 101 and 102 of the body 100. Since the first insulating layer 610 is formed to fill the recesses R1 and R2 as a whole, an appearance defect may be reduced in the coil component 1000 according to the present embodiment, compared to the case in which the first insulating layer 610 is not formed.

The first insulating layer 610 may extend to the sixth surface 106 of the body 100 and may expose the pad portions 420 and 520. For example, the first insulating layer 610 is disposed to extend from the recesses R1 and R2 to the sixth surface 106 of the body 100, and the opening O may extend to the sixth surface 106 of the body 100 to expose the pad portions 420 and 520. The first insulating layer 610 may be integrally formed on the sixth surface 106 of the body 100 and the inner surfaces of the recesses R1 and R2. The first insulating layer 610 may be formed on the sixth surface 106 of the body 100 and the inner surfaces of the recesses R1 and R2, in such a manner that the opening O is formed by a screen printing method or an inkjet printing method. On the other hand, in the case of the present embodiment, the first insulating layer 610 may be disposed on the sixth surface 106 of the body 100 and the inner surfaces of the recesses R1 and R2 before the external electrodes 400 and 500 are formed. Therefore, the first insulating layer 610 may function as a mask in selectively forming the external electrodes 400 and 500 on the sixth surface 106 of the body 100 and the inner surfaces of the recesses R1 and R2. For example, in forming the external electrodes 400 and 500 by a plating method, the first insulating layer 610 may function as a plating resist.

On the sixth surface 106 of the body 100, the first insulating layer 610 may be disposed on the outer side of each of both ends of the pad portions 420 and 520 in the width direction W. For example, on the sixth surface 106 of the body 100, the pad portions 420 and 520 may be formed to be spaced apart from edges that are formed between the sixth surface 106 of the body 100 and the third and fourth surfaces 103 and 104 of the body 100, respectively. As the first insulating layer 610 is disposed on the outer side of each of the ends of the pads 420 and 520 in the width direction W, short-circuits with other components adjacent to each other in the width direction W when the coil component 1000 according to the present embodiment is mounted may be prevented. In addition, an increase in the effective mounting area occupied by the coil component 1000 according to the present embodiment on the mounting substrate, due to the size occupied by the bonding member such as solder or the like, may be prevented. The first insulating layer 610 may be collectively formed on respective coil components at a coil bar level in a state before respective coil components are individualized. For example, the process of forming the first insulating layer 610 may be performed between the aforementioned pre-dicing process and the individualization process.

The second insulating layer 620 may be disposed on the first insulating layer 610. In detail, the second insulating layer 620 is disposed on the first to fifth surfaces 101, 102, 103, 104 and 105 of the body 100 to cover the insulating layer 610 disposed on the inner surfaces of the recesses R1 and R2. The second insulating layer 620 does not extend to the first insulating layer 610 disposed on the sixth surface 106 of the body 100. On the other hand, the opening O is also extended to the second insulating layer 620 to expose the connection portions 410 and 510 externally.

When the external electrodes 400 and 500 are selectively formed on the body 100, the second insulating layer 620 may function as a mask together with the first insulating layer 610. Accordingly, the second insulating layer 620 may be formed in a process between a process of forming the first insulating layer 610 and a process of forming the external electrodes 400 and 500. The second insulating layer 620 is in contact with the respective first to fifth surfaces 101, 102, 103, 104 and 105 of the body 100, and is in contact with the other surface of the first insulating layer 610 on the inner walls of the recesses R1 and R2. The process of forming the second insulating layer 620 may be performed after completing the process of individualizing the coil bar.

The third insulating layer 630 is respectively disposed on the first and second surfaces 101 and 102 of the body 100 to cover the second insulating layer 620 and the connection portions 410 and 510. In the present embodiment, the first insulating layer 610 is formed on the inner surfaces of the recesses R1 and R2 and the surface of the body 100, excluding regions in which the connection portions 410 and 510 and the pad portions 420 and 520 are to be formed; a temporary member is attached to the region in which the connection portions 410 and 510 and the pad portions 420 and 520 are to be formed; the second insulating layer 620 is formed on the first to fifth surfaces 101, 102, 103, 104 and 105 of the body 100; the lead-out portions 231 and 232 are exposed externally by removing the temporary member; and then, the connection portions 410 and 510 and the pad portion 420 and 520 may be formed in the region from which the temporary member has been removed. Therefore, the connection portions 410 and 510 are exposed externally without being covered by the second insulating layer 620. The third insulating layer 630 is respectively disposed on the first and second surfaces 101 and 102 of the body 100, to cover the connection portions 410 and 510 that are not covered by the second insulating layer 620. In one example, an insulating member may include the first, second, and third insulating layers 610, 620, and 630. Since the first insulating layer 610 and the second insulating layer have an opening O in which the connection portion 410 or 510 is formed and the first insulating layer 610 does not extend onto the first or second surfaces 101 and 102, a thickness (e.g., a length in the length direction L) of a portion 601 of the insulating member disposed on the connection portion 410 or 510 may be less than a thickness (e.g., a length in the length direction L) of another portion 602 of the insulating member disposed in the recess R1 or R2 and spaced apart from the connection portion 410 or 510.

Each of the insulating layers 610, 620 and 630 may include a thermoplastic resin such as a polystyrene-based, vinyl acetate-based, polyester-based, polyethylene-based, polypropylene-based, polyamide-based, rubber-based, acrylic-based resin, etc., a thermosetting resin such as a phenol-based, epoxy-based, urethane-based, melamine-based, alkyd-based resin, etc., a photoimageable resin, parylene, $SiO_x$ or $SiN_x$. Each of the insulating layers 610, 620 and 630 may further include an insulating filler such as an inorganic filler, but the configuration is not limited thereto.

Therefore, the coil component 1000 according to the present embodiment may easily implement a lower electrode structure while reducing the size of the component. For example, unlike the related art, since the external electrodes 400 and 500 are not formed to protrude from the first to fourth surfaces 101, 102, 103 and 104 of the body 100, the entire length and width of the coil component 1000 are not increased. In addition, since the external electrodes 400 and 500 may be formed relatively thin through a plating method or the like, the entire thickness of the coil component 1000 may be reduced.

Figure 10:
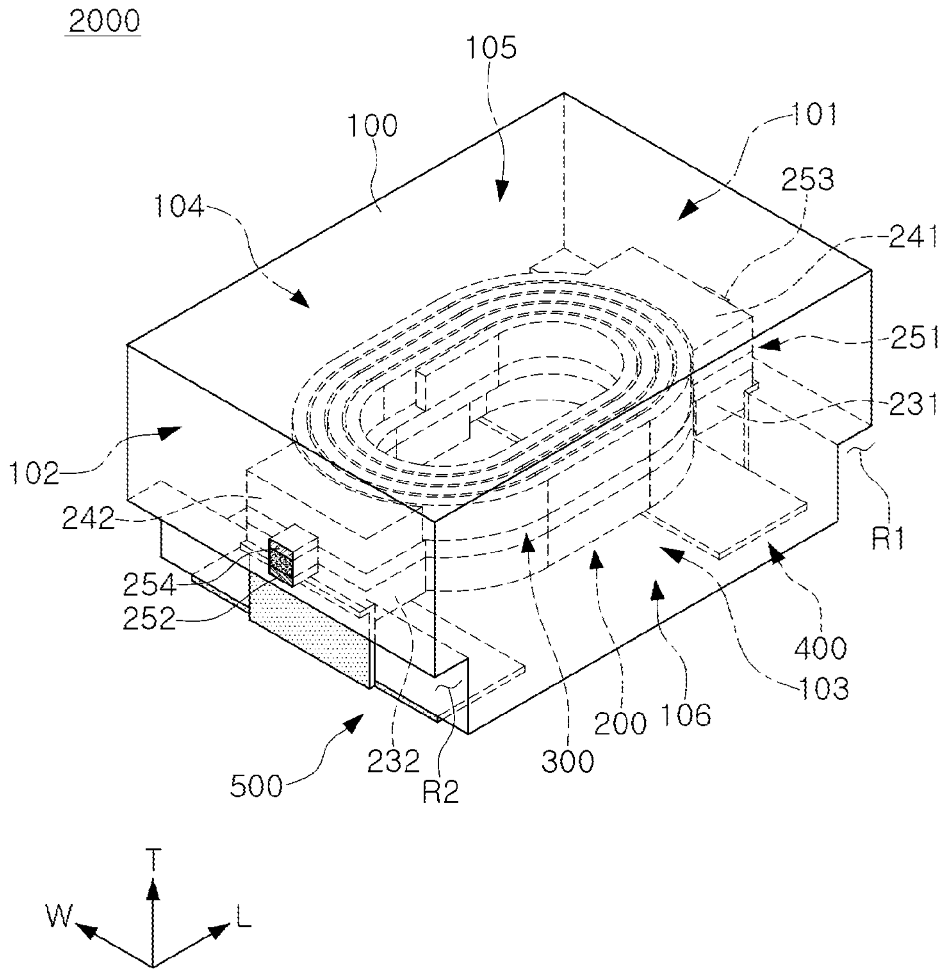
FIG. 10 is a view schematically illustrating a coil component according to another embodiment and illustrating that an insulating layer is omitted.

FIG. 10 is a view schematically illustrating a coil component according to another embodiment, and is a view illustrating that an insulating layer is omitted.

Referring to FIGS. 1 to 9 and FIG. 10, a coil component 2000 according to an embodiment is different from the coil component 1000 according to the embodiment in terms of a coil portion 200. Therefore, in describing the present embodiment, only the coil portion 200 different from that in the foregoing embodiment will be described. For the remaining configurations of the present embodiment, the description in the foregoing embodiment may be applied as it is.

The coil portion 200 applied to the present embodiment may further include coupling reinforcing portions 251, 252, 253 and 254, extended from the lead-out portions 231 and 232 and the auxiliary lead-out portions 241 and 242, respectively, and exposed to the first and second surfaces 101 and 102 of the body 100. In detail, the coil portion 200 may further include the first coupling reinforcing portion 251 extended from the first lead-out portion 231 and exposed to the first surface 101 of the body 100, the second coupling reinforcing portion 252 extended from the second lead-out portion 232 and exposed to the second surface 102 of the body 100, the third coupling reinforcing portion 253 extended from the first auxiliary lead-out portion 241 and exposed to the first surface 101 of the body 100, and the fourth coupling reinforcing portion 254 extended from the second auxiliary lead-out portion 242 and exposed to the second surface 102 of the body 100.

Unlike in the embodiment, the lead-out portions 231 and 232 and the auxiliary lead-out portions 241 and 242 applied to the present embodiment are not exposed to the first and second surfaces 101 and 102 of the body 100, while the coupling reinforcing portions 251, 252, 253 and 254 extending from the lead-out portions 231 and 232 and the auxiliary lead-out portions 241 and 242 to both end surfaces 101 and 102 of the body 100 are exposed to both end faces 101 and 102 of the body 100.

The coupling reinforcing portions 251, 252, 253 and 254 may respectively have a width (a length in the width direction W) less than a width (a length in the width direction W) of each of the lead-out portions 231 and 232 and the auxiliary lead-out portions 241 and 242, or may have a thickness (a length in the thickness direction T) less than a thickness (a length in the thickness direction T) of each of the lead-out portions 231 and 232 and the auxiliary lead-out portions 241 and 242. For example, as the coupling reinforcing portions 251, 252, 253 and 254 are employed, the volume of the end side of the coil portion 200 may be reduced, thereby significantly reducing the area of the coil portion 200 exposed to the first and second surfaces 101 and 102 of the body 100.

Therefore, the coil component 2000 according to the present embodiment may improve the coupling force between the coil portion 200 and the body 100 on the end side of the coil portion 200. For example, since the coupling reinforcing portions 251, 252, 253 and 254, which are smaller in volume than the lead-out portions 231 and 232 and the auxiliary lead-out portions 241 and 242, are disposed on the end portion side of the coil portion 200, a contact area between the coil portion 200 and the body 100 increases on the outer portion of the coil portion 200. As a result, the coupling force between the coil portion 200 and the body 100 may be improved.

In addition, the coil component 2000 according to the present embodiment may prevent deterioration of component characteristics by improving the effective volume of a magnetic material.

In addition, in the coil component 2000 according to the present embodiment, the area of the coil portion 200 exposed to both end surfaces 101 and 102 of the body 100 may be reduced, thereby preventing a short-circuit with other components.

As set forth above, according to an embodiment, the size of a coil component may be reduced.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil component comprising:

a body having a sixth surface and a fifth surface opposing each other in a first direction, a first surface and a second surface respectively connecting the fifth surface and the sixth surface of the body and opposing each other in a second direction, and a third surface and a fourth surface respectively connecting the first surface and the second surface of the body and opposing each other in a third direction;

a recess disposed in an edge between one of the first surface and the second surface of the body and the sixth surface of the body;

a coil portion disposed inside the body and exposed from the body through the recess; and an external electrode including a connection portion disposed in the recess and connected to the coil portion, and a pad portion disposed on the sixth surface of the body, wherein a length of the connection portion in the third direction is less than a length of the pad portion in the third direction and is less than a length of the recess in the third direction, an inner wall of the recess includes a portion of the coil portion, and in a cross-section in the first direction and the second direction, the connection portion is in contact with the inner wall including the portion of the coil portion.

2. The coil component of claim 1, wherein the recess extends to the third surface and the fourth surface of the body.

3. The coil component of claim 1, wherein the connection portion and the pad portion are integrated with each other.

4. The coil component of claim 1, wherein the inner wall of the recess is parallel to the one of the first surface and the second surface, and a portion of the connection portion in contact with the inner wall is parallel to the one of the first surface and the second surface.

5. The coil component of claim 1, further comprising a first insulating layer disposed in the recess and having an opening exposing the connection portion.

6. The coil component of claim 5, wherein the first insulating layer extends to the sixth surface of the body and exposes the pad portion.

7. The coil component of claim 6, wherein the pad portion on the sixth surface of the body is spaced apart from the third surface and the fourth surface of the body.

8. The coil component of claim 5, further comprising a second insulating layer disposed on the first insulating layer, wherein the opening extends into the second insulating layer to expose the connection portion.

9. The coil component of claim 8, wherein the second insulating layer respectively extends to the third surface and the fourth surface of the body and the fifth surface of the body.

10. The coil component of claim 8, further comprising a third insulating layer disposed on the first surface and the second surface of the body to cover the second insulating layer and the connection portion.

11. The coil component of claim 1, further comprising a support substrate disposed inside the body, wherein the coil portion is disposed on the support substrate.

12. The coil component of claim 11, wherein the coil portion comprises:

a first coil pattern disposed on one surface of the support substrate, a first lead-out portion disposed on the one surface of the support substrate and connected to the first coil pattern, and a second lead-out portion disposed on the one surface of the support substrate to be spaced apart from each of the first coil pattern and the first lead-out portion, wherein the first and second lead-out portions are respectively exposed through the recess and another recess disposed in an edge between another of the first and second surfaces of the body and the sixth surface of the body.

13. The coil component of claim 12, wherein the first and second lead-out portions are exposed to the first surface and the second surface of the body, respectively.

14. The coil component of claim 12, wherein the coil portion further comprises coupling reinforcing portions extended from the first and second lead-out portions and exposed to the first surface and the second surface of the body, respectively.

15. The coil component of claim 12, wherein the coil portion further comprises a second coil pattern disposed on the other surface of the support substrate, opposing the one surface of the support substrate, and a via penetrating through the support substrate to connect the first coil pattern and the second coil pattern.

16. The coil component of claim 15, wherein the coil portion further includes:

a first auxiliary lead-out portion disposed on the other surface of the support substrate to be spaced apart from the second coil pattern, and connected to the first lead-out portion; and a second auxiliary lead-out portion disposed on the other surface of the support substrate to be connected to the second coil pattern, and connected to the second lead-out portion.

17. A coil component comprising:

a body having a sixth surface and a fifth surface opposing each other, a first surface and a second surface respectively connecting the fifth surface and the sixth surface of the body and opposing each other, and a third surface and a fourth surface respectively connecting the first surface and the second surface of the body;

a recess disposed in an edge between one of the first surface and the second surface of the body and the sixth surface of the body;

a coil portion disposed inside the body and exposed from the body through the recess;

an external electrode including a connection portion disposed in the recess and connected to the coil portion, and a pad portion disposed on the sixth surface of the body; and a first insulating layer disposed in the recess and having an opening exposing the connection portion.

18. The coil component of claim 17, wherein the recess extends to the third surface and the fourth surface of the body.

19. The coil component of claim 17, wherein the first insulating layer is also disposed on the sixth surface of the body and has another opening exposing the pad portion.

20. The coil component of claim 17, further comprising a second insulating layer disposed on the first insulating layer, wherein the opening extends into the second insulating layer to expose the connection portion.

21. The coil component of claim 20, further comprising a third insulating layer disposed on the first surface and the second surface of the body to cover the second insulating layer and the connection portion.

22. The coil component of claim 17, further comprising a support substrate disposed inside the body, the coil portion comprises:

a first coil pattern disposed on one surface of the support substrate;

a first lead-out portion disposed on the one surface of the support substrate and connected to the first coil pattern;

a second lead-out portion disposed on the one surface of the support substrate to be spaced apart from each of the first coil pattern and the first lead-out portion;

a second coil pattern disposed on the other surface of the support substrate, opposing the one surface of the support substrate;

a via penetrating through the support substrate to connect the first coil pattern and the second coil pattern;

a first auxiliary lead-out portion disposed on the other surface of the support substrate to be spaced apart from the second coil pattern, and connected to the first lead-out portion; and a second auxiliary lead-out portion disposed on the other surface of the support substrate to be connected to the second coil pattern, and connected to the second lead-out portion, wherein the first and second lead-out portions are respectively exposed through the recess and another recess disposed in an edge between another of the first and second surfaces of the body and the sixth surface of the body.

23. The coil component of claim 17, wherein the pad portion is spaced apart from the third surface and the fourth surface of the body.

24. A coil component comprising:

a body having a sixth surface and a fifth surface opposing each other, a first surface and a second surface respectively connecting the fifth and sixth surfaces of the body and opposing each other, and a third surface and a fourth surface respectively connecting the first surface and the second surface of the body and opposing each other in one direction;

a recess disposed in an edge between one of the first and second surfaces of the body and the sixth surface of the body;

a coil portion disposed inside the body and exposed from the body through the recess;

an external electrode including a connection portion disposed in the recess and connected to the coil portion, and a pad portion disposed on the sixth surface of the body; and an insulating member disposed in the recess, wherein a thickness of a portion of the insulating member disposed on the connection portion is less than a thickness of another portion of the insulating member spaced apart from the connection portion.

25. The coil component of claim 24, wherein the insulating member includes a first insulating layer having an opening exposing the connection portion, and a third insulating layer disposed on the first insulating layer and the connection portion.

26. The coil component of claim 25, wherein the third insulating layer is also disposed on the one of the first surface and the second surface of the body.

27. The coil component of claim 25, wherein the insulating member further including a second insulating layer disposed between the first and third insulating layers, wherein the opening extends into the second insulating layer to expose the connection portion.

28. The coil component of claim 27, wherein the second insulating layer is also disposed on the one of the first surface and the second surface of the body.

29. The coil component of claim 24, wherein a length of the pad portion in the one direction is greater than a length of the connection portion in the one direction.

30. The coil component of claim 24, wherein the pad portion is spaced apart from the third surface and the fourth surface of the body.

* * * * *